United States Patent
Paulov

(10) Patent No.: US 10,808,605 B2
(45) Date of Patent: Oct. 20, 2020

(54) ADJUSTING DEVICE FOR ACTUATING AN ACTUATOR OF A TURBOCHARGER, AND TURBOCHARGER FOR AN INTERNAL COMBUSTION ENGINE

(71) Applicant: CONTINENTAL AUTOMOTIVE GMBH, Hannover (DE)

(72) Inventor: Mark Paulov, Dannstadt-Schauernheim (DE)

(73) Assignee: Vitesco Technologies GmbH, Hannover (DE)

( * ) Notice: Subject to any disclaimer, the term of this patent is extended or adjusted under 35 U.S.C. 154(b) by 42 days.

(21) Appl. No.: 15/950,760

(22) Filed: Apr. 11, 2018

(65) Prior Publication Data
US 2018/0230899 A1 Aug. 16, 2018

Related U.S. Application Data

(63) Continuation of application No. PCT/EP2016/072463, filed on Sep. 21, 2016.

(30) Foreign Application Priority Data

Oct. 14, 2015 (DE) .......................... 10 2015 219 899

(51) Int. Cl.
*F02B 37/18* (2006.01)
*F01D 17/10* (2006.01)
*F16C 11/06* (2006.01)

(52) U.S. Cl.
CPC .......... *F02B 37/186* (2013.01); *F01D 17/105* (2013.01); *F16C 11/0604* (2013.01);
(Continued)

(58) Field of Classification Search
CPC ...... F02B 37/18; F02B 37/186; F01D 17/105; F16C 17/08
(Continued)

(56) References Cited

U.S. PATENT DOCUMENTS 2,917,334 A * 12/1959 Baker ................. F16C 11/0633
403/140
2,956,844 A * 10/1960 Wright .................... F16C 17/08
384/609

(Continued)

FOREIGN PATENT DOCUMENTS

DE 102009057151 A1 6/2011
DE 102010020102 A1 11/2011
(Continued)

OTHER PUBLICATIONS

Definition of Point by Merriam-Webster, merriam-webster.com/dictionary/point (Year: 2019).*
(Continued)

*Primary Examiner* — Vinh Luong

(57) ABSTRACT

An actuating device for operating an actuating element of a turbocharger, comprises an actuating drive for generating an actuating force; and a coupling device which is mechanically coupled to the actuating drive and to the actuating element and which is designed to transmit the actuating force to the actuating element; wherein the coupling device has a coupling rod which is coupled, in each case by means of a joint, both to the actuating drive and to the actuating element; at least one of the joints is formed as a ball joint and has a ball socket and a ball head; and a sphere-like surface either of the ball head or of the ball socket of the corresponding joint is formed such that the ball head and the ball socket are in contact by way of at least two contact points in the assembled state.

11 Claims, 4 Drawing Sheets

(52) U.S. Cl.
CPC ...... *F16C 11/0661* (2013.01); *F16C 11/0695* (2013.01); *F16C 2240/06* (2013.01); *F16C 2360/24* (2013.01); *Y02T 10/144* (2013.01)

(58) Field of Classification Search
USPC .......................................................... 403/124
See application file for complete search history.

(56) References Cited

U.S. PATENT DOCUMENTS

| | | | | |
|---|---|---|---|---|
| 3,005,647 | A | * | 10/1961 | Collier ................ F16C 11/0666 403/125 |
| 3,375,028 | A | * | 3/1968 | De Lane ............. F16C 11/0604 403/126 |
| 3,418,011 | A | * | 12/1968 | Scheublein, Jr. ... F16C 11/0647 403/125 |
| 3,429,598 | A | * | 2/1969 | Scheublein, Jr. ... F16C 11/0609 403/128 |
| 4,806,040 | A | * | 2/1989 | Gill ......................... F01L 1/146 123/90.61 |
| 5,509,748 | A | * | 4/1996 | Idosako .............. F16C 11/0638 384/203 |
| 5,655,848 | A | * | 8/1997 | Catron ................ F16C 11/0604 403/137 |
| 6,273,631 | B1 | | 8/2001 | Takahashi et al. |
| 6,386,787 | B1 | * | 5/2002 | Reichelt ............. F16C 11/0638 403/140 |
| 8,757,648 | B1 | * | 6/2014 | Winter .................. B60G 7/001 280/124.134 |
| 2002/0172546 | A1 | | 11/2002 | Rivin |
| 2011/0211905 | A1 | * | 9/2011 | Koch ................. F16C 11/0623 403/144 |
| 2014/0165331 | A1 | * | 6/2014 | Kang .................. F16C 11/0652 16/224 |
| 2015/0107404 | A1 | * | 4/2015 | Heidingsfelder ......... F16C 7/02 74/586 |
| 2015/0167542 | A1 | * | 6/2015 | Reinisch ............... F01D 17/105 417/405 |
| 2015/0273966 | A1 | * | 10/2015 | Nilsson ............... F16C 11/0628 403/132 |
| 2016/0146098 | A1 | * | 5/2016 | Dilalan ................. F02B 37/186 251/228 |

FOREIGN PATENT DOCUMENTS

| | | | |
|---|---|---|---|
| DE | 102012211444 A1 | | 1/2014 |
| DE | 102017202132 A1 | * | 8/2018 |
| EP | 0976919 A2 | * | 2/2000 |
| FR | 2823795 A1 | | 10/2002 |
| WO | 2013173057 A1 | | 11/2013 |
| WO | WO 2018/145908 A1 | * | 8/2018 |

OTHER PUBLICATIONS

EPO Machine Translation of DE 102012211444 of Ragogna et al., dated Jan. 9, 2014 (Year: 2014).*
Definition of Area by Merriam-Webster, merriam-webster.com., Nov. 1, 2019 (Year: 2019).*
International Search Report and Written Opinion dated Dec. 20, 2016 from corresponding International Patent Application No. PCT/EP2016/072463.
German Office Action dated Feb. 17, 2017 for corresponding German Patent Application No. 10 2015 219 899.5.
China Office Action, dated Aug. 5, 2019, for counterpart CN patent application 201680060224.9.

* cited by examiner

Prior art

ADJUSTING DEVICE FOR ACTUATING AN ACTUATOR OF A TURBOCHARGER, AND TURBOCHARGER FOR AN INTERNAL COMBUSTION ENGINE

CROSS-REFERENCE TO RELATED APPLICATION

This application is a continuation of International application No. PCT/EP2016/072463, filed Sep. 21, 2016, which claims priority to German application No. 10 2015 219 899.5, filed on Oct. 14, 2015, each of which is hereby incorporated by reference herein in its entirety.

TECHNICAL FIELD

The invention relates to an actuating device for operating an actuating element of a turbocharger.

BACKGROUND

Internal combustion engines may be equipped with a turbocharger, in particular an exhaust-gas turbocharger. Typically, an actuating device is provided for operating an actuating element of the turbocharger. For example, the actuating element is operated in two directions (bidirectionally) by means of the actuating device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An actuating device for operating an actuating element of a turbocharger comprises an actuating drive for generating an actuating force. The actuating device furthermore has a coupling device which is mechanically coupled to the actuating drive and to the actuating element and which is designed to transmit the actuating force to the actuating element. The coupling device has a coupling rod which is mechanically coupled, in each case by means of a joint, both to the actuating drive and to the actuating element. At least one of the joints is formed as a ball joint and has a ball socket and a ball head. A sphere-like surface either of the ball head or of the ball socket of the corresponding joint is formed such that the ball head and the ball socket are in contact by way of at least two contact points during the operation of the actuating device.

The actuating element may be for example a valve, a valve flap such as a so-called wastegate valve flap or a so-called VTG mechanism (variable turbine geometry mechanism). The actuating drive may be designed for example as an electric motor or as a pressure capsule, e.g. a negative-pressure capsule. The ball socket is designed to receive the ball head in the assembled state, such that said ball head is mounted in the ball socket and a ball joint is formed. The sphere-like surface may for example be understood to mean that surface which is in contact with the corresponding spherical surface of the counterpart, that is to say either ball socket or ball head. The sphere-like surface may also be referred to as a dome.

A sphere-like surface may mean that the surface deviates from an exact spherical shape with a single sphere radius such that the ball head and the ball socket make contact by way of at least two contact points in the assembled state. In other words, the ball head is received in the ball socket such that said ball head is at all times mounted in the ball socket by way of two contact points. The sphere-like surface accordingly has a special shaping or contour for permitting the contact by way of at least two contact points. The shaping is generated for example by cutting machining by means of a milling tool. Alternatively, the sphere-like surface is generated by primary forming or deformation.

The at least two contact points provided is conducive to a low level of component wear. Typically, the coupling rod and the joints are arranged outside the engine and the housing thereof and are exposed to high temperatures, dirt, salt water and the like and fluctuating conditions such as moisture and dryness. A reduced contact pressure (Hertzian stress) is also contributed to. For example, the actuating forces to be transmitted are transmitted not via one contact point but via two or more contact points. If, by contrast to this, both the ball socket and ball head have an exactly defined spherical surface, these would make contact only at one contact point during operation, which contributes to increased wear. Further, the contact points may, with regard to their spatial position, be adapted to different load situations. One skilled in the art would be able to determine variations in the arrangement of the contact points in a manner dependent on actuating forces to be transmitted.

According to the first aspect, either the sphere-like surface of the ball head or of the ball socket is designed in accordance with the arrangement described herein. For example, the sphere-like surface of the ball socket is machined correspondingly, whereas a ball surface of the ball head has an exactly defined shaping, which lies within manufacturing tolerances, with a single sphere radius.

In one refinement, the sphere-like surface has at least two surface segments, and the ball head and the ball socket make contact in each of the at least two surface segments. A surface segment thus constitutes a separately defined area section or area region of the sphere-like surface. There is thus one contact point per surface segment. Depending on requirements and the load situation, it is thus possible for multiple surface segments of the sphere-like surface to be provided and correspondingly designed such that the desired contact between the ball head and the ball socket is realized during operation.

In a further embodiment, the at least two surface segments each have a predetermined contour. The surface segments thus each have a freely selectable contour, which has for example a constant curvature κ (κ=1/R=constant; R=radius), a non-constant curvature κ (κ=1/R=non-constant, R=radius) or both types of curvatures.

In a further embodiment, the at least two surface segments each have a predetermined sphere radius, and central points of each sphere radius are arranged spaced apart from one another. It is thereby ensured that the ball socket and ball head make contact at, at least two contact points. For example, the central points of the ball radii are spaced apart by a few tenths of a millimeter, for example 0.45 mm, up to several millimeters. The central points of the sphere radii therefore do not coincide, giving rise to at least two different surface segments of the sphere-like surface. In other words, the surface segments with predetermined sphere radii constitute a case of a contour with constant curvature. In this way, the sphere-like surface deviates from an exactly defined sphere shape with a single radius. The predetermined sphere radii may differ in size or may be of equal size. In this way, an adaptation to specific load situations is made possible. For example, a uniform load distribution is contributed to.

In a further embodiment, the at least two surface segments are distributed uniformly over the circumference of the sphere-like surface. In other words, a width of the surface segments is equal. This contributes to a uniform load distribution. The width is defined for example by means of angles which are measured in relation to a central longitudinal axis of a bore of the ball socket and a central longitudinal axis of a body with the ball head respectively. For example, a section plane through the ball head or the ball socket is generated where a diameter of the sphere-like surface is at its greatest. The section plane preferably runs through a ball central point, for example through the ball pin. For example, the section plane runs through that region of the ball socket which has the greatest diameter of the sphere-like surface, if the ball socket is smaller than a hemisphere shape.

In alternative embodiments, the surface segments are distributed non-uniformly, even in the case of only two surface segments.

In a further embodiment, the actuating device has at least one pin-like body with the ball head, wherein the sphere-like surface is formed such that the at least two contact points are arranged with a predetermined spacing to a central longitudinal axis of the pin-like body. The pin-like body is for example a cylindrical and/or rotationally symmetrical body such as a ball pin. The predetermined spacing may for example be particularly small. Such a spacing is for example smaller than half of the sphere radius of the corresponding surface segments. It is thus possible for the contact points to be arranged at the outer longitudinal end of the ball head, close to the central longitudinal axis. Such an arrangement is expedient if a load acts on the joint parallel to the axis of the ball pin.

In a further embodiment, the ball socket has a bore for mechanical coupling to the coupling rod, and the sphere-like surface is formed such that the at least two contact points are arranged with a predetermined spacing to a central longitudinal axis of the bore. The predetermined spacing can for example be selected to be small, for example smaller than half of the sphere radius of the corresponding surface segments. In this way, the contact points are arranged as close as possible to the axis of the bore of the ball socket, e.g. for loads which act parallel to the axis of the bore of the ball socket or perpendicular to the central longitudinal axis of the ball pin.

In a further embodiment, the sphere-like surface is designed such that the ball head and the ball socket are in contact by way of three contact points. Analogously to the embodiments described above, three surface segments can be provided in this case. Three-point support of the ball head in the ball socket is thereby ensured. In this way, the ball socket can be supported on the ball head in a manner distributed effectively over the sphere-like surface. This is conducive to expedient and defined positioning of the ball head relative to the ball socket. This is conducive to the possibility of manufacturing tolerances being compensated and to a degree of wear being kept low.

In a further embodiment, the ball socket has a bore for mechanical coupling to the coupling rod, and the sphere-like surface is formed such that two of the at least three contact points are arranged symmetrically with respect to a plane of symmetry, wherein the plane of symmetry runs through the central longitudinal axis of the bore. In this way, a special adaptation to magnitudes of the tensile and compressive forces that are transmitted to or from the joint via the coupling rod can be ensured. For example, the plane of symmetry runs normal to the central longitudinal axis of the pin-like body with the ball head. In this way, allowance is made for example for load situations in which a tensile force which, in terms of magnitude, is greater than a relatively low compressive force acts on the joint in the longitudinal direction of the coupling rod.

In a further embodiment, one of the at least three contact points lies on the central longitudinal axis of the bore. In this way, it is for example possible for two of the contact points to be provided for the transmission of a force which, in terms of magnitude, is greater than an oppositely directed force, wherein for example, a symmetrical, that is to say uniform, load distribution in the respective force direction is achieved.

According to a second aspect, a turbocharger for an internal combustion engine is disclosed, which has an actuating device according to the first aspect of the invention. For the mechanical coupling of a coupling rod to an actuating drive and/or to an actuating element, the actuating device has a joint formed as a ball joint. The joint has a ball socket and a ball head. A sphere-like surface either of the ball head or of the ball socket of the joint is formed such that the ball head and the ball socket are in contact by way of at least two contact points in the assembled state.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further advantages and functions are described in the following detailed description of exemplary embodiments with the aid of the appended figures. In the figures.

DETAILED DESCRIPTION

Figure 1:
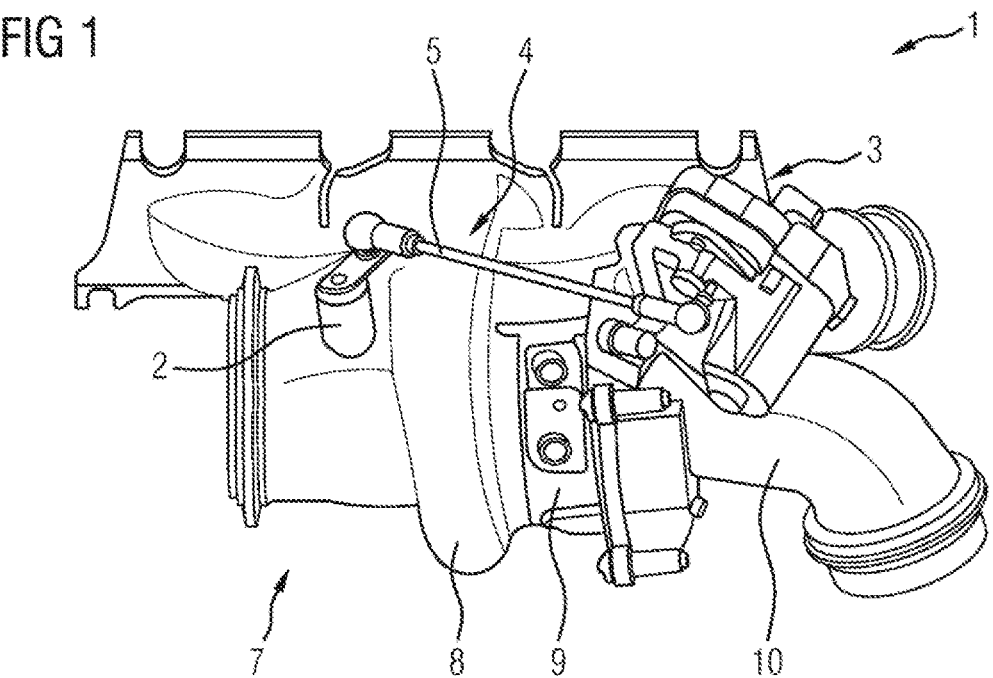
FIG. 1 shows a perspective view of a turbocharger with an actuating device.
Figure 2:
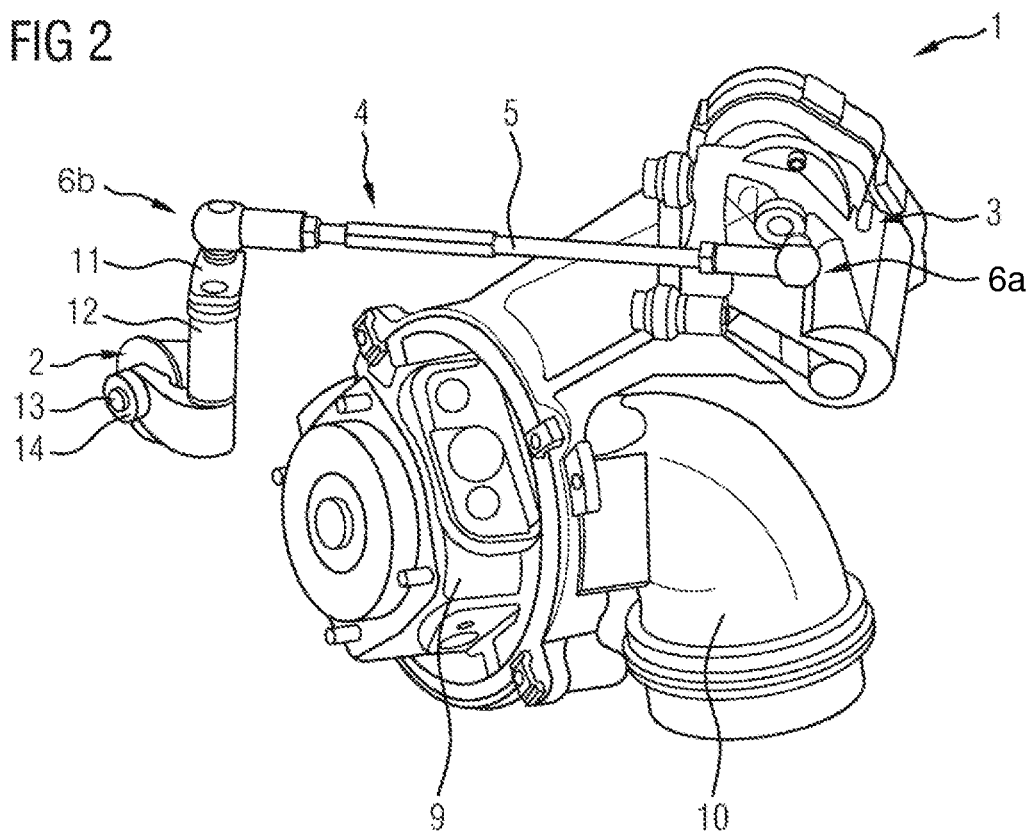
FIG. 2 shows a further perspective view of the turbocharger.

FIGS. 1 and 2 show, in each case in a perspective view, a turbocharger 7 which has a turbine housing 8, a bearing housing 9 and a compressor housing 10. The turbocharger 7 is an exhaust-gas turbocharger. The turbocharger 7 is provided for an internal combustion engine with a combustion motor. A combustion motor of said type has at least one cylinder to which fresh gas, in particular air, is supplied. The fresh gas flows via a fresh-gas tract (also referred to as intake tract) to the cylinder. After a combustion of fuel in the cylinder, exhaust gas passes out of the cylinder via an exhaust tract. During operation of the described internal combustion engine, a gas flow in the exhaust tract drives a turbine in the turbine housing 8 of the turbocharger 7, which turbine drives, via a shaft, a compressor in the compressor housing 10. The compressor compresses fresh gas that is situated in the fresh-gas tract, before said fresh gas is supplied to the cylinder of the combustion motor. It is thus possible to increase an efficiency of the combustion motor.

To control the turbocharger 7, an actuating device 1 is provided which has an actuating element 2, an actuating drive 3 and a coupling device 4. The actuating drive 3, which in the exemplary embodiment is formed as an electric motor, transmits actuating forces by means of the coupling device 4 to the actuating element 2 in order to adjust the latter. The actuating element 2 is typically moved between two end positions.

The coupling device 4 has a coupling rod 5 which is mechanically coupled by means of a joint 6 to the actuating drive 3. By means of a further joint 6, the coupling rod is mechanically coupled to the actuating element 2. Here, the further joint 6 is mechanically connected to the actuating element 2 via a lever 11, a bushing 12, a spindle 13 and a disk 14. The spindle 13 is arranged in the bushing 12 so as to be rotatable about an axis of rotation, and is connected rotationally conjointly to the actuating element. The coupling device 4 is designed to transmit actuating forces, which are generated by the actuating drive, via the coupling rod 5 to the actuating element 2. In one exemplary embodiment, the actuating element 2 is a valve flap, in particular a so-called wastegate flap.

FIGS. 3A to 3D show various views of a conventional embodiment of a joint 6 of the turbocharger 7 as per FIGS. 1 and 2. It is pointed out at this juncture that both joints 6 as per FIGS. 1 and 2 or else only one of the two joints 6 may be designed as described below.

Figure 3A:
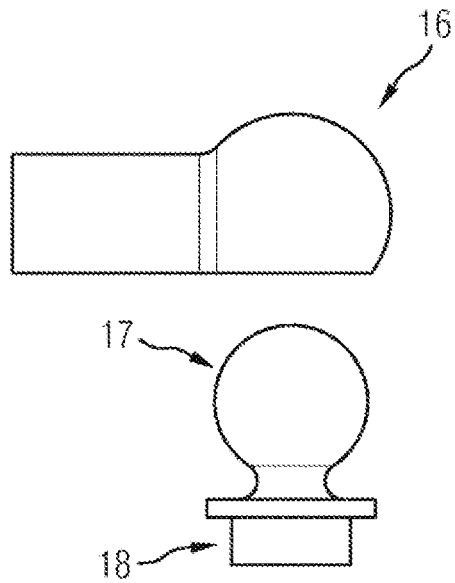
FIGS. 3A to 3D show various views of a joint of the actuating device according to the prior art.
Figure 3B:
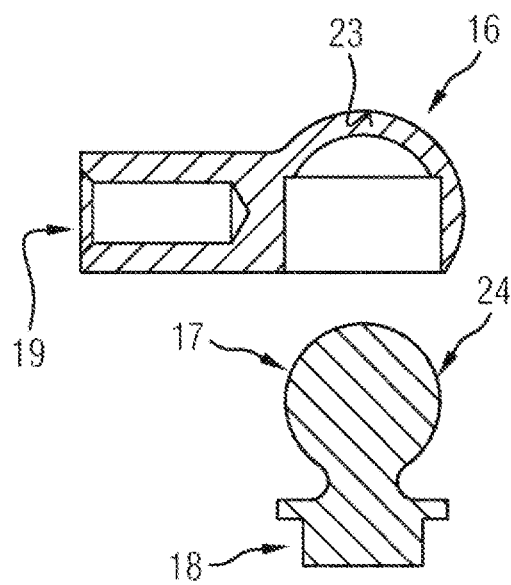
Figure 3C:
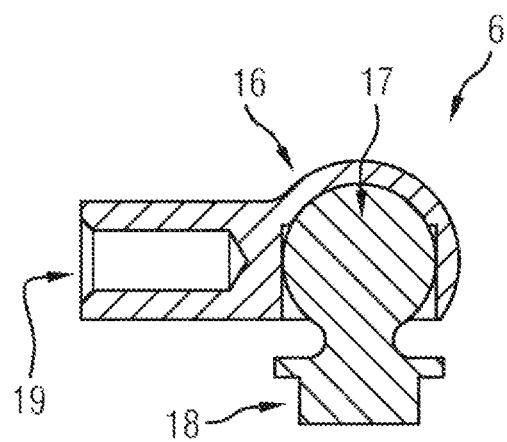
Figure 3D:
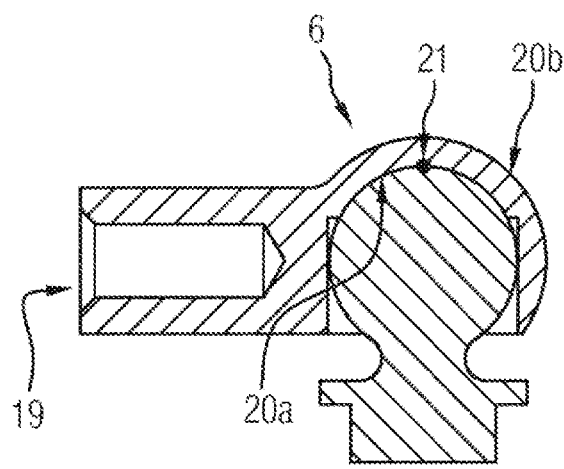

The joint 6 has a ball socket 16 and a ball pin 18 with a ball head 17. The ball socket 16 has a bore 19, by means of which the ball socket 16 is mechanically connectable to the coupling rod 4. This is realized by means of a screw connection. There are however also alternative expedient connecting techniques, such as for example welding. The ball socket 16 has a ball receptacle with a spherical surface 23. By means of the surface 23, the ball head 17 with its spherical surface 24 can be received in the ball socket 16, as shown in FIG. 3C. In the exemplary embodiment as per FIGS. 3A to 3D, the sphere-like surface 23 of the ball socket 16 is defined almost exactly, allowing for manufacturing tolerances, by a constant sphere radius 20b. The surface 23 of the ball socket 16 is thus defined by a single central point. Analogously, the ball head 17 has an almost exact surface 24 with one sphere radius 20a, which need not correspond exactly to the sphere radius 20b of the ball socket 16. In the case of such an embodiment, the ball head 17 and ball socket 16 in the assembled state make contact at one contact point 21 at all times during the operation of the actuating device 1 (see FIG. 3D). The contact point 21 can move in a manner dependent on the actuation of the actuating drive 3 and position of the coupling rod 4 relative to the ball pin 18. However, all of the actuating forces are at all times transmitted via a single point of contact at the contact point 21.

To improve the susceptibility of a joint 6 of said type to wear, the contact between the ball socket 16 and the ball head 17 is provided as illustrated on the basis of the following FIGS. 4 to 7. The embodiments described below are again conceivable for both or one of the joints 6 shown in FIGS. 1 and 2. A joint as described below may be used at an end of the coupling rod 5 which is assigned to the turbine or the turbine housing 8 of the turbocharger 7 or which is arranged closer to the turbine (on the left in FIGS. 1 and 2).

During the operation of the internal combustion engine and of the turbocharger 7, it is for example possible to measure 400° to 500° Celsius at or in said joint 6 owing to the hot exhaust-gas air. By contrast to this, lower temperatures, for example 150° to 200° Celsius, prevail at that joint 6 which is arranged at the compressor side. Owing to these hot temperatures, admissible contact pressure limit values of the materials used vary. In particular, the contact pressure limit values are reduced to an extent at the turbine-side joint 6, whereby increased wear occurs.

Figure 4:
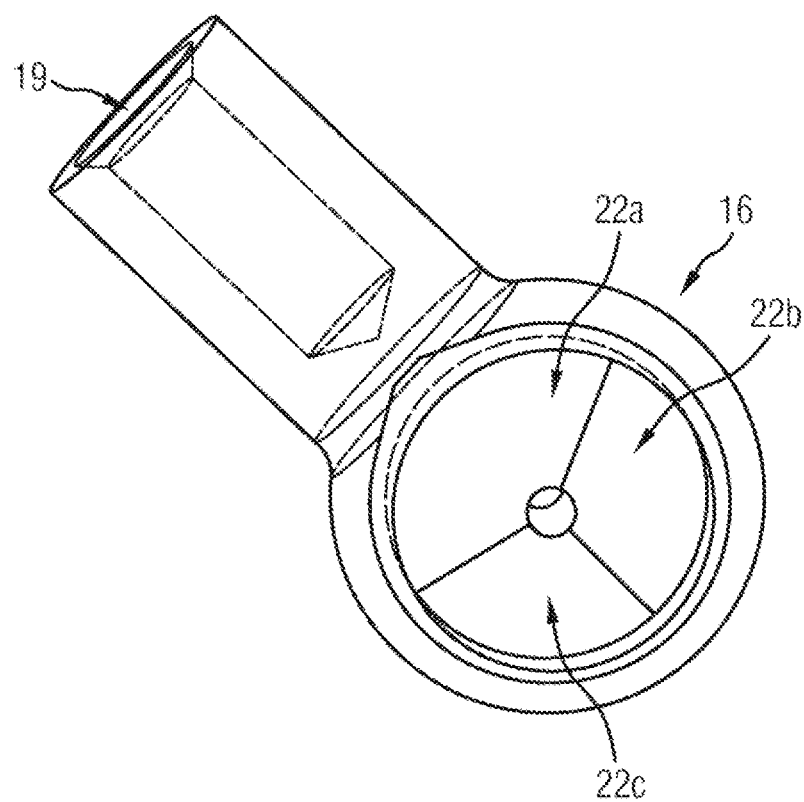
FIG. 4 shows a schematic view of a ball socket of a joint according to a second exemplary embodiment.

FIG. 4 shows a schematic view of an optimized ball socket 16, the sphere-like surface 23 of which has three surface segments 22a to 22c that adjoin one another. The surface 23 thus deviates from an exact spherical shape with a single sphere radius. Each surface segment 22a to 22c is in itself of spherical form and has its own sphere radius. The central point of the respective radii do not meet or do not coincide. In other words, the surface contour of each surface segment 22a to 22c is in itself spherical.

Figure 5:
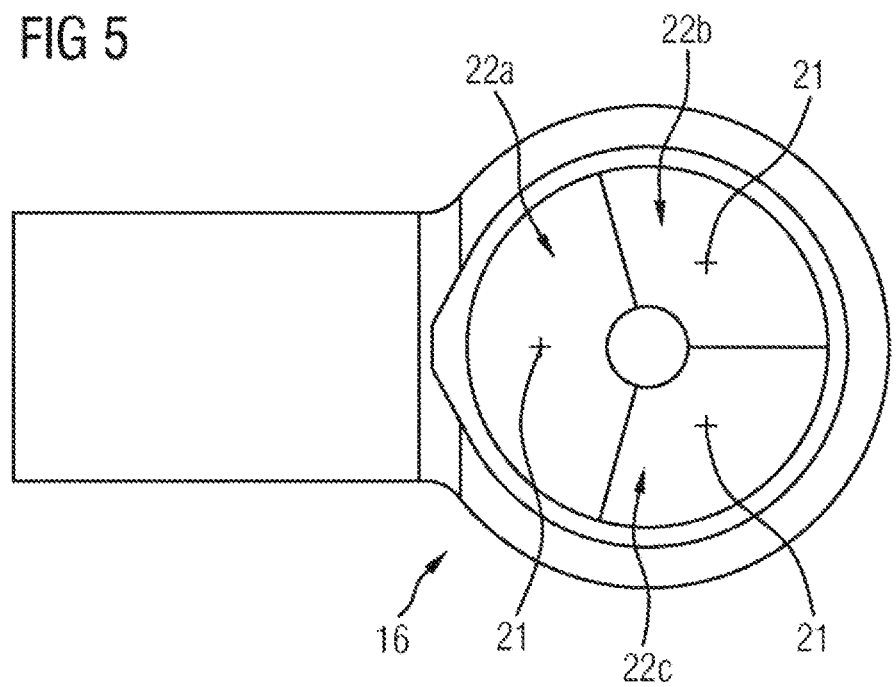
FIG. 5 shows a schematic view of the ball socket of the joint according to the second exemplary embodiment.

The surface segments 22a to 22c are formed such that, in the assembled state as shown in FIG. 5, contact is generated between the ball head 17 (not shown) and the ball socket 16 at three contact points 21. The contact points 21 move, in a manner dependent on the actuating force of the actuating drive 3 and/or on the position of the actuating element 2, owing to the movement of the ball head 17 with respect to the ball socket. The ball head 17 thus makes contact with the ball socket 16 at one point within each surface segment 22a to 22c. In this exemplary embodiment, the sphere radii of all of the surface segments 22a to 22c are identical. Furthermore, the surface segments 22a to 22c are distributed uniformly over the sphere-like surface 23. In this way, a uniform load distribution during the operation of the actuating device is ensured. The sphere radii may be of different magnitudes depending on the load situation or the requirements. The distribution of the surface segments may also be non-uniform. It is possible in this way to react to different usage situations.

Figure 6:
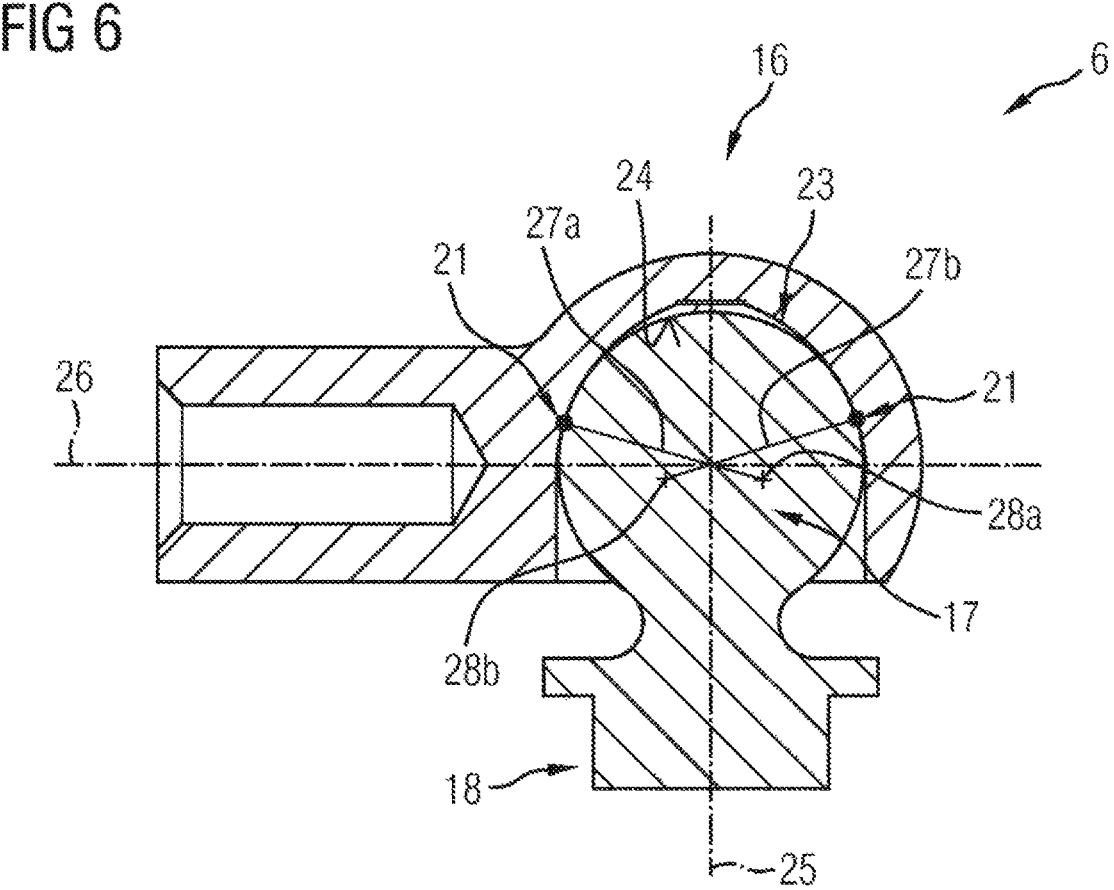
FIG. 6 shows a joint of the actuating device according to a third exemplary embodiment.

FIG. 6 shows a further joint 6, wherein two contact points 21 can be seen. The two contact points 21 have a respective sphere radius 27a and 27b of equal magnitude, but the central points 28a and 28b thereof do not coincide, but rather are spaced apart from one another. Said spacing ranges for example from a few tenths of millimeters up to several millimeters. In the exemplary embodiment, the contact points 21 are selected so as to be arranged symmetrically with respect to a central longitudinal axis 25 of the ball pin 18.

Figure 7:
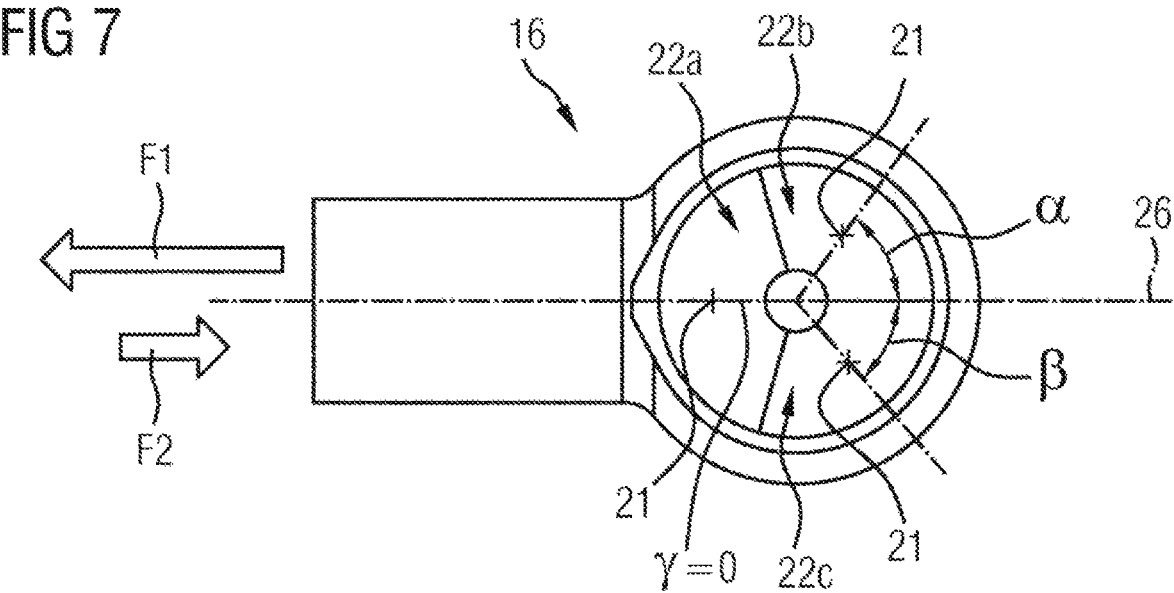
FIG. 7 shows a schematic view of the ball socket according to the second exemplary embodiment.

FIG. 7 shows the ball socket 16 as per the exemplary embodiment of FIGS. 4 and 5. In this case, two contact points 21 are arranged mirror-symmetrically with respect to a plane of symmetry running through a central longitudinal axis of the bore 19. The plane of symmetry runs normal to the central longitudinal axis 25 of the ball pin 18, analogously to FIG. 6 (not illustrated in FIG. 7). The two contact points 21 are arranged, relative to the central longitudinal axis 25 of the ball pin 18, on a side which faces toward an outer end (on the right in FIG. 7). In FIG. 7, the position of the two contact points 21 is defined by means of angles $\alpha$ and $\beta$, which are measured in relation to the plane of symmetry. Here, the angles $\alpha$ and $\beta$ are equal. One contact point lies on the central longitudinal axis 26 of the bore 19, wherein the angle γ thereof relative to the plane of symmetry is 0°. In such a case, allowance is made for a load in the case of which a tensile force F1 is, in terms of magnitude, greater than a compressive force F2 acting on the joint 6.

Owing to the contact between the ball head 17 and the ball socket 16 at three contact points 21, the component wear can be considerably reduced owing to reduced contact pressure. Furthermore, the contact points may be selected in accordance with the load situation; torsion may also arise aside from tensile and compressive forces.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An actuating device for operating an actuating element of a turbocharger, the actuating element comprising one of a valve and a valve flap, the actuating device comprising:
   an actuating drive for generating an actuating force, the actuating drive comprising one of an electric motor and a pressure capsule;
   a coupling device which is mechanically coupled to the actuating drive and to the actuating element and which transmits the actuating force to the actuating element, the coupling device including a coupling rod which is mechanically coupled to both the actuating drive and the actuating element;
   one or more joints for the coupling rod and each of the actuating drive and the actuating element, wherein at least one of the joints is formed as a ball joint, wherein the joint has a ball socket and a ball head;
   partial sphere-shaped surfaces on one of the ball head and the ball socket, wherein the partial sphere-shaped surfaces are formed such that the ball head and the ball socket are in contact by way of three contact points when assembled, the contact points defining the contact between the ball head and the ball socket;
   three surface segments which are part of the partial sphere-shaped surfaces, and the ball head and ball socket are in contact in each of the three surface segments such that each surface segment includes one contact point;
   wherein the three surface segments each has a predetermined contour, and the surface segments each has a predetermined sphere radius and a radius center, and radius centers of the surface segments are arranged spaced apart from one another,
   wherein the ball socket has a bore for the mechanical coupling to the coupling rod, the partial sphere-shaped surfaces are formed such that two of the three contact points are arranged symmetrically with respect to a plane of symmetry, the plane of symmetry runs through the central longitudinal axis of the bore, and one of the three contact points lies on the central longitudinal axis of the bore.

2. The actuating device of claim 1, wherein the three surface segments are distributed uniformly over the circumference of the partial sphere-shaped surfaces.

3. The actuating device of claim 1, further comprising at least one ball pin with the ball head, and wherein the partial sphere-shaped surfaces are formed such that the contact points are arranged with a predetermined spacing to a central longitudinal axis of the at least one ball pin.

4. The actuating device of claim 1, wherein each of the three surface segments having located thereon exactly one contact point of the contact points.

5. The actuating device of claim 1, wherein each contact point occurs over a nonzero space or area of a corresponding surface segment, the three contact points being spaced apart from each other.

6. The actuating device of claim 1, wherein each surface segment has located thereon exactly one contact point of the three contact points.

7. The actuating device of claim 1, wherein the partial sphere-shaped surfaces are on the ball socket.

8. An actuating device for operating an actuating element of a turbocharger, the actuating element comprising one of a valve and a valve flap, the actuating device comprising:
   an actuating drive for generating an actuating force, the actuating drive comprising one of an electric motor and a pressure capsule;
   a coupling device which is mechanically coupled to the actuating drive and to the actuating element and which transmits the actuating force to the actuating element, the coupling device including a coupling rod which is mechanically coupled to both the actuating drive and the actuating element;
   one or more joints for the coupling rod and each of the actuating drive and the actuating element, wherein at least one of the joints is formed as a ball joint having a ball socket and a ball head;
   a surface on one of the ball head and the ball socket, wherein the surface is formed such that the ball head and the ball socket are in contact by way of at least two contact points when assembled, each contact point occurring over a nonzero space or area, the contact points defining the contact between the ball head and the ball socket and being spaced apart from each other;
   three surface segments which are part of the surface, and the ball head and ball socket are in contact in each of the surface segments such that each surface segment includes one contact point;
   wherein each surface segment has a predetermined sphere radius and a radius center, the radius centers of the surface segments being spaced apart from each other,
   wherein the ball head and the ball socket are in contact by way of exactly three contact points,
   wherein the ball socket has a bore for the mechanical coupling to the coupling rod, the surface is formed such that two of the three contact points are arranged mirror-symmetrically with respect to a plane of symmetry, wherein the plane of symmetry runs through the central longitudinal axis of the bore, and one of the three contact points lies on the central longitudinal axis of the bore.

9. The actuating device of claim 8, wherein the surface segments are distributed uniformly over the circumference of the surface.

10. The actuating device of claim 8, further comprising at least one ball pin with the ball head, and wherein the surface is formed such that two of the three contact points are arranged with a predetermined spacing to a central longitudinal axis of the at least one ball pin.

11. The actuating device of claim 8, partial sphere-shaped surfaces are on the ball socket.

* * * * *